(12) United States Patent
Tomura

(10) Patent No.: US 7,982,778 B2
(45) Date of Patent: Jul. 19, 2011

(54) IMAGING APPARATUS USABLE AS EITHER A MASTER APPARATUS OR A SLAVE APPARATUS AND A METHOD USABLE THEREWITH

(75) Inventor: Masaharu Tomura, Kanagawa (JP)

(73) Assignee: Sony Corporation (JP)

( * ) Notice: Subject to any disclaimer, the term of this patent is extended or adjusted under 35 U.S.C. 154(b) by 1054 days.

(21) Appl. No.: 11/823,779

(22) Filed: Jun. 27, 2007

(65) Prior Publication Data
US 2008/0002040 A1 Jan. 3, 2008

(30) Foreign Application Priority Data
Jun. 29, 2006 (JP) .................................. 2006-179947

(51) Int. Cl.
*H04N 5/232* (2006.01)
*H04N 5/76* (2006.01)
(52) U.S. Cl. .................................. 348/211.3; 348/231.3
(58) Field of Classification Search ............ 386/38, 386/40, 46, 107, 117, 124; 348/231.3–231.6, 348/211.3
See application file for complete search history.

(56) References Cited

U.S. PATENT DOCUMENTS
2004/0150724 A1* 8/2004 Nozaki et al. ............. 348/211.4
2005/0002648 A1* 1/2005 Hoshino et al. ................ 386/69

FOREIGN PATENT DOCUMENTS
JP 08-088790 A 4/1996
JP 2004-312281 11/2004

* cited by examiner

*Primary Examiner* — Kelly L Jerabek
(74) *Attorney, Agent, or Firm* — Lerner, David, Littenberg, Krumholz & Mentlik, LLP

(57) ABSTRACT

An imaging apparatus contains a signal-producing unit that produces an image signal on an image of an imaged subject, a data-superimposing unit that superimposes ancillary data over the image signal produced in the signal-producing unit, and a control unit that controls the signal-producing unit to set the operation of the signal-producing unit. The control unit supplies the data-superimposing unit with the ancillary data including information that indicates setting condition of the signal-producing unit. The data-superimposing unit receives the ancillary data from the control unit and superimposes the ancillary data over the image signal.

5 Claims, 3 Drawing Sheets

FIG. 3

| Name | | Data |
|---|---|---|
| ADF | | 000h |
| | | 3FFh |
| | | 3FFh |
| DID | | xxh |
| SDID | | 01h |
| DC | | xxh |
| UDW | Model Name | yyyh |
| | Camera ID | yyyh |
| | Frame Number | yyyh |
| | Frequency (1000/1001) | yyyh |
| | Interlace/Progressive | |
| | Frequency1 | |
| | Frequency0 | |
| | Step Shutter | yyyh |
| | Master Gain | yyyh |
| | ND Filter | yyyh |
| | CC Filter | yyyh |
| | D5600 ON | yyyh |
| | Shutter ON | |
| | Video Processor Control Data | yyyh |
| | Look up table data | yyyh |
| CRC | | yyyh |
| | | yyyh |
| CKSUM | | xxh |

IMAGING APPARATUS USABLE AS EITHER A MASTER APPARATUS OR A SLAVE APPARATUS AND A METHOD USABLE THEREWITH

CROSS-REFERENCE TO RELATED APPLICATIONS

The present application claims priority from Japanese Patent Application No. JP 2006-179947, filed in the Japanese Patent Office on Jun. 29, 2006, the entire content of which is incorporated herein by reference.

BACKGROUND OF THE INVENTION

1. Field of the Invention

The present invention relates to an imaging apparatus, a method of producing an image signal, and a method of setting an imaging operation of an imaging apparatus.

2. Description of Related Art

When an imaging apparatus images a subject, a setting condition of the imaging apparatus has been checked after imaging the subject or has been stored in a recording medium in order to image a subject newly under the same setting condition as the former condition.

Japanese Patent Application Publication No. H08-88790 has disclosed an electronic camera that stores in a recording medium any image data when pushing a release bottom of the electronic camera down. The header information of the image data to be recorded includes a setting condition of the electronic camera. Thus, when the header information includes a setting condition of the camera, a user checks under which setting condition the camera is used by reading the setting condition included in the header information if the recorded image data is reproduced. Setting the electronic camera by using the read setting condition enables setting condition of the electronic camera to be reused.

SUMMARY OF THE INVENTION

If, however, the setting condition is included in the header information of the image data and both of the image data and the header information are recorded in the recording medium, it is difficult to set the imaging apparatus to the setting condition recorded in the recording medium unless the imaging apparatus is equipped with the recording medium. When imaging the subject with plural imaging apparatuses that should be set to any identical setting condition, the header information stored in the recording medium is copied into other recording media and then, the imaging apparatuses are respectively equipped with these recording media, each of which has recorded the copied header information. It, thus, may be difficult to set the imaging apparatuses easily and quickly.

If the imaging apparatuses are set by reading the header information from the recording media, even when the setting is changed in any one of the imaging apparatuses, the setting in the other imaging apparatus is not changed. Therefore, if the plural imaging apparatuses produce an image signal on a video image when the imaging apparatuses produce the image signals under the same setting condition, it is difficult to change the setting condition in any imaging apparatuses while imaging the subject.

It is thus desirable to provide an imaging apparatus, a method of producing an image signal and a program product therefor, a method of setting an imaging operation of an imaging apparatus and a program product therefor, by which a setting condition of the imaging apparatus can be easily set into desired ones, and if imaging the subject with the plural imaging apparatuses, the setting of each of the plural imaging apparatuses can be synchronously carried out.

According to an embodiment of the present invention, there is provided an imaging apparatus containing a signal-producing unit that produces an image signal on an image of an imaged subject, a data-superimposing unit that superimposes ancillary data over the image signal produced in the signal-producing unit, and a control unit that controls the signal-producing unit to set the operation of the signal-producing unit. The control unit supplies the data-superimposing unit with the ancillary data including information that indicates setting condition of the signal-producing unit. The data-superimposing unit receives the ancillary data from the control unit and superimposes the ancillary data over the image signal.

According to another embodiment of the present invention, there is provided a method of producing an image signal on an image of an imaged subject. The method includes a signal-producing step of producing the image signal, an ancillary-data-producing step of producing ancillary data including information that indicates setting condition in producing the image signal, and a data-superimposing step of superimposing the produced ancillary data over the produced image signal.

According to further embodiment of the present invention, there is provided a program product of producing an image signal, which allows a computer to perform the above method.

In the above embodiments of the invention, according to the imaging apparatus and the method of producing the image signal, in which the image signal on the image of the imaged subject is produced and the ancillary data including the information that indicates setting condition in producing the image signal is superimposed over the produced image signal.

According to additional embodiment of the present invention, there is provided an imaging apparatus containing a signal-producing unit that produces an image signal on an image of an imaged subject, a data-extracting unit that extracts ancillary data from the image signal received from outside, and a control unit that controls the signal-producing unit to perform setting of the signal-producing unit based on the ancillary data extracted in the data-extracting unit. The ancillary data includes information that indicates setting condition of the signal-producing unit. When the ancillary data is superimposed over the image signal produced in the signal-producing unit to supply the data-extracting unit with the superimposed signal as the image signal received from outside, the control unit controls the signal-producing unit to make the setting of the signal-producing unit identical to the setting in producing the image signal received from outside, based on the ancillary data extracted in the data-extracting unit.

According to still another embodiment of the present invention, there is provided a method of setting an imaging operation of an imaging apparatus. The method includes a signal-producing step of producing an image signal on an image of an imaged subject, a data-extracting step of extracting ancillary data from an image signal received from outside, and an operation-setting step of setting production operation of the image signal based on the extracted ancillary data. The ancillary data includes information that indicates setting condition of another imaging apparatus when the above another imaging apparatus produces the image signal on the image of the imaged subject. When the ancillary data is superimposed over the produced image signal and the superimposed signal is supplied as the image signal received from outside, the setting of the production operation for the image signal is made identical to the setting condition in producing the image signal received from outside in the operation-setting step, based on the extracted ancillary data.

According to still further embodiment of the present invention, there is provided a program product of setting an imaging operation of an imaging apparatus, which allows a computer to perform the above method.

In the above embodiments of the invention, according to the imaging apparatus and the method of setting the imaging operation of an imaging apparatus, in which when the image signal over which the ancillary data including information that indicates setting condition of another imaging apparatus is superimposed is received from outside, the ancillary data is extracted from the received image signal and the setting of the production operation for the image signal can be set in the imaging apparatus of interest based on the extracted ancillary data.

In the above embodiments, the terms, "information that indicates setting condition" is referred to as "information that allows another imaging apparatus to produce an image signal similar to that of the imaging apparatus of interest if this information is used to set the above another imaging apparatus". For example, if an image signal on an image of an imaged subject is produced in an imaging portion constituted of image pick-up device and any kinds of signal processing is performed on the image signal to get an image signal having a desired format, the information indicates setting condition in the imaging portion in producing the image signal and/or setting condition in the signal-processing portion in processing the signal.

Thus, superimposing the ancillary data including the information that indicates setting condition of another imaging apparatus in producing the image signal over the image signal allows a user to correctly grasp setting condition of the above another imaging apparatus in producing the image signal. Superimposing the ancillary data over the image signal within a blanking period of time of the image signal enables the ancillary data to be superimposed without exerting any influence on the signal within active video area. Superimposing the ancillary data over the image signal within a blanking period of time of the image signal also enables, even if setting condition is changed, the ancillary data including information that indicates the changed setting condition to be superimposed over the image signal in synchronism with the image signal.

When, from outside, receiving the image signal over which the ancillary data including information that indicates the setting condition of another imaging apparatus, the ancillary data is extracted from the received image signal and the production operation of the image signal in the imaging apparatus of interest is set based on the ancillary data, so that it is possible to automatically make the setting condition of the imaging apparatus of interest in producing the image signal identical to the setting condition of the above another imaging apparatus in producing the image signal received from outside.

Even if setting condition is changed in producing the image signal received from the outside when the production operation of the image signal is set in the imaging apparatus of interest based on the extracted ancillary data, it is possible to change setting of the production operation of the image signal by the imaging apparatus of interest in synchronism with the setting change of the above another imaging apparatus in producing the image signal received from the outside. If the ancillary data is extracted from the received image data when the user manipulates the user interface unit to instruct any extraction of the ancillary data, by instructing the extraction of ancillary data at a period of time when obtaining an optimal image signal, it is possible to reproduce setting condition when obtaining the optimal image signal.

Thus, according to the embodiments of the invention, the imaging apparatus can be easily set to its desired condition as well as when a subject is imaged using plural imaging apparatuses, their setting can be in synchronism with each other.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 3 is a table for showing a data structure of ancillary data.

DESCRIPTION OF THE PREFERRED EMBODIMENTS

The following will describe embodiments of the present invention with reference to the accompanied drawings.

Figure 1:
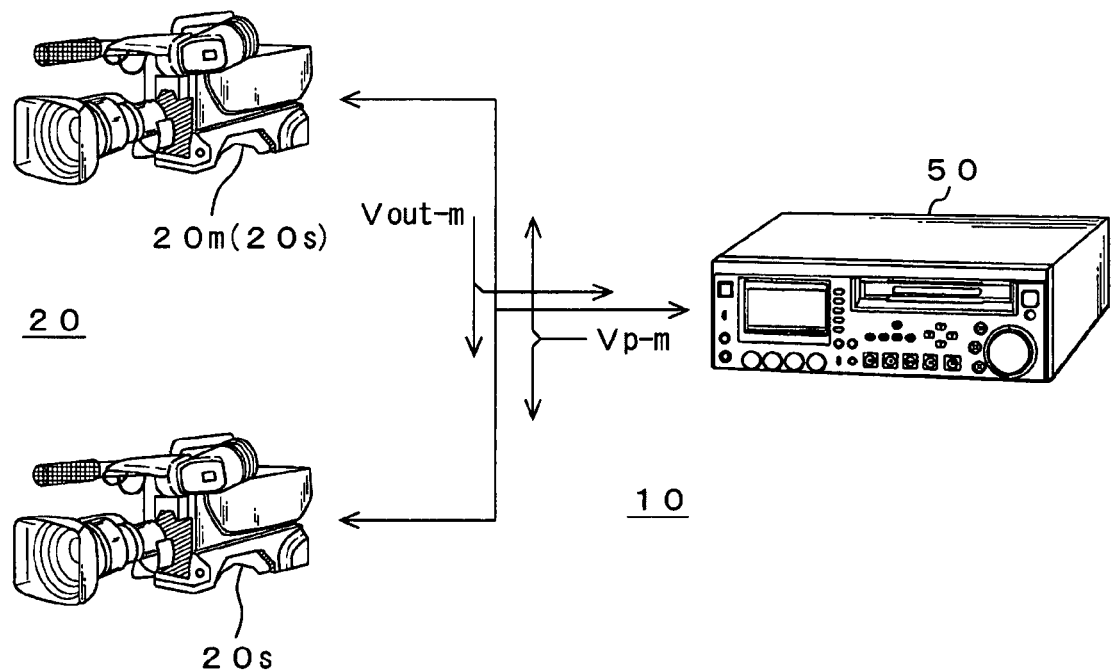
FIG. 1 is a diagram for illustrating a configuration of an imaging system.

FIG. 1 shows a configuration of an imaging system 10. The imaging system 10 contains plural imaging apparatuses 20. A basic imaging apparatus (hereinafter referred to as "master imaging apparatus") 20*m* produces ancillary data including information that indicates setting condition of the master imaging apparatus 20*m*. The produced ancillary data is then superimposed over the imaging signal in the master imaging apparatus 20*m* and outputted. Other imaging apparatus or apparatuses (hereinafter referred to as "slave imaging apparatus") 20*s* excluding the master imaging apparatus 20*m* extracts or extract the ancillary data from the superimposed image signal while receiving the superimposed image signal from the master imaging apparatus 20*m*. The slave imaging apparatus 20*s* is set based on the extracted ancillary data.

When the imaging system 10 further contains a signal-recording/reproducing apparatus 50, the signal-recording/reproducing apparatus 50 receives the image signal and the like from the master and slave imaging apparatuses 20*m*, 20*s* to record them. The signal-recording/reproducing apparatus 50 also reads the recorded image signal and the like to reproduce them. When the signal-recording/reproducing apparatus 50 reproduces the image signal on which the ancillary data indicating setting condition of the master imaging apparatus is superimposed and supplies the imaging apparatus or apparatuses with it, each of the imaging apparatuses that receive such the superimposed image signal functions as the slave imaging apparatus 20*s* and extracts the ancillary data from the received image signal so as to be set based on the extracted ancillary data.

Figure 2:
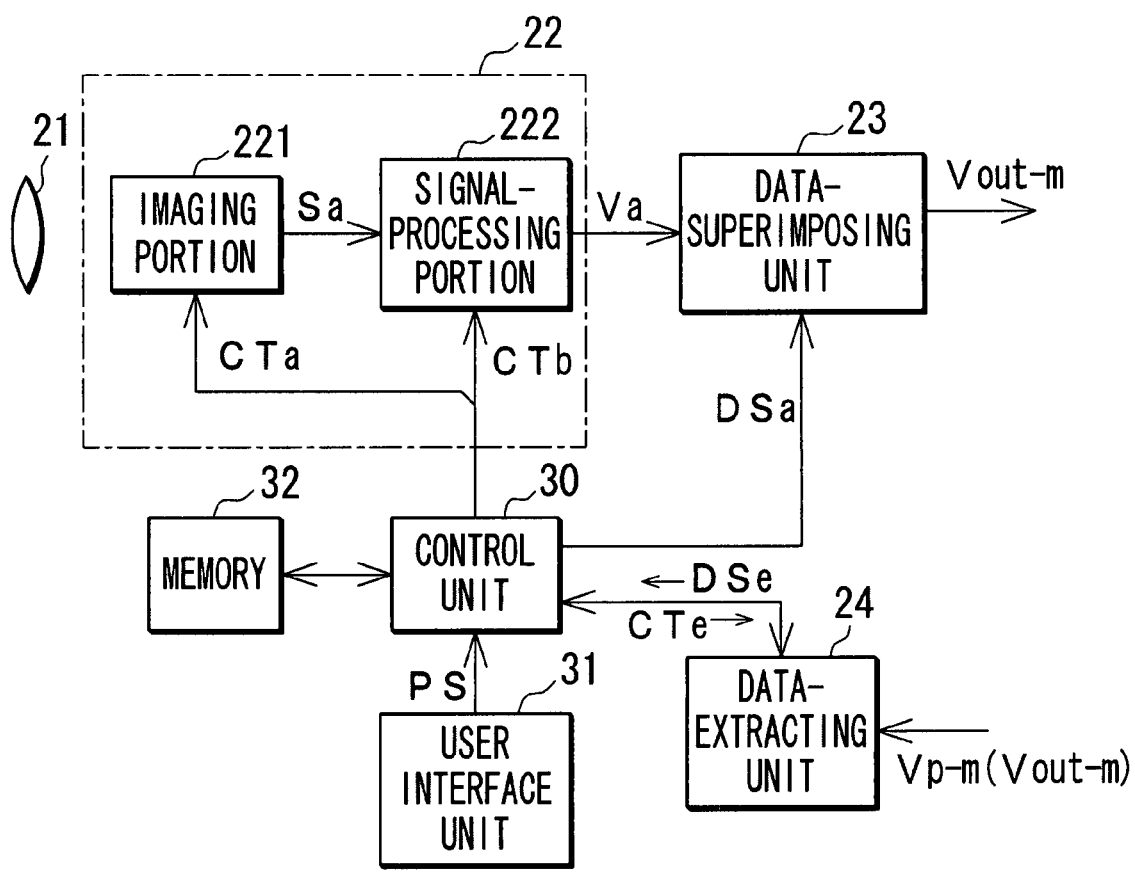
FIG. 2 is a block diagram for illustrating a configuration of an embodiment of an imaging apparatus according to the invention.

FIG. 2 illustrates a configuration of an embodiment of an imaging apparatus according to the invention. This imaging apparatus is included in the plural imaging apparatuses 20. The other imaging apparatus or apparatuses of the plural imaging apparatuses 20 may have any configurations similar to that of this imaging apparatus or different from that of this imaging apparatus as far as the other imaging apparatus or apparatuses has or have the function similar to that of this imaging apparatus.

In this imaging apparatus, a ray of light incident through an image pickup lens 21 is irradiated to an imaging portion 221 of the signal-producing unit 22 that produces an image signal on an image of an imaged subject. The imaging portion 221 is constituted of solid-state image pickup device such as charge-coupled device (CCD) and produces an image signal Sa corresponding to the image of the imaged subject.

A signal-processing portion 222 of the signal-producing unit 22 performs various kinds of adjustment processing such as γ correction, Knee saturation, and color calibration on the image signal Sa produced in the imaging portion 221. The signal-processing portion 222 converts the processed signal into an image signal Va having a certain format to output it.

A data-superimposing unit 23 receives the image signal Va from the signal-processing portion 222 and ancillary data DSa from a control unit 30, which will be described later. In the data-superimposing unit 23, the received ancillary data DSa is then superimposed over the received image signal Va. For example, the data-superimposing unit 23 superimposes the ancillary data Ds over the image signal Va within a blanking period of time of the image signal Va and then, outputs the superimposed ones as an image signal Vout-m.

A data-extracting unit 24 extracts ancillary data DSe from an image signal received from outside on which the ancillary data DSe has been superimposed based on a control signal CTe received from the control unit 30. For example, the data-extracting unit 24 may extract ancillary data from an image signal Vp-m that is received from the signal-recording/reproducing apparatus 50, on which the ancillary data is superimposed. The data-extracting unit 24 may also extract ancillary data from an image signal Vout-m that is received from the master imaging apparatus 20m, on which the ancillary data is superimposed. The data-extracting unit 24 then supplies the control unit 30 with the extracted ancillary data DSe.

To the control unit 30, a user interface unit 31 and a memory 32 are connected. The user interface unit 31 produces an operation signal PS corresponding to user's manipulation and supplies the control unit 30 with it. If the user interface unit 31 is connected to any camera control unit, not shown, which is provided outside, the user interface unit 31 also supplies the control unit 30 with an outside control signal received from the camera control unit as an operation signal PS.

The memory 32 stores information indicating setting condition of the imaging apparatus shown in FIG. 2, information used in various kinds of signal processing for producing the image signal in this imaging apparatus, and the like. From or into the memory 32, the control unit 30 controls the memory 32 to read or write such the information.

The control unit 30 generates control signals CTa, CTb based on the operation signal PS received from the user interface unit 31 or information read from the memory 32. The control unit 30 also supplies the imaging portion 221 with the generated control signal CTa and supplies the signal-processing portion 222 with the generated control signal CTb to control the whole of this imaging apparatus to perform any desired operations thereof.

The control unit 30 may control this imaging apparatus to set it as the master imaging apparatus 20m or the slave imaging apparatus 20s based on the operation signal PS received from the user interface unit 31 or the information read from the memory 32.

When any of the imaging apparatuses 20 is set as the master imaging apparatus, its control unit 30 generates the ancillary data DSa including the information that indicates setting condition in the imaging portion 221 and the information that indicates setting condition in the signal-processing portion 222 to supply the data-superimposing unit 23 with it.

When any of the imaging apparatuses 20 is set as the slave imaging apparatus, the control unit 30 controls the data-extracting unit 24 by supplying the data-extracting unit 24 with the control signal CTe to extract the ancillary data. In this moment, if the control unit 30 receives the ancillary data DSe from the data-extracting unit 24, the control unit 30 generates the control signals CTa, CTb based on the extracted ancillary data DSe to supply the imaging portion 221 with the generated control signal CTa and to supply the signal-processing portion 222 with the generated control signal CTb. Thus, the imaging portion 221 and the signal-processing portion 222 are controlled so that they can accomplish the setting condition of the master imaging apparatus 20m.

It is to be noted that although the data-superimposing unit 23 and the data-extracting unit 24 have been illustrated in FIG. 2, if the imaging apparatus does not function as the master imaging apparatus, the data-superimposing unit 23 can be omitted. Contrarily, if the imaging apparatus does not function as the slave imaging apparatus, the data-extracting unit 24 can be omitted.

In each of the imaging apparatuses 20 thus configured, the control unit 30 controls the imaging portion 221 to realize its setting condition or the setting condition of the master imaging apparatus based on the control signal CTa. For example, the control unit 30 controls the imaging portion 221 to set a frame rate of the image signal Sa to be produced therein, a shatter speed when an electronic shatter operation is established therein, a color conversion filter used therein, a neutral density filter used therein and the like, based on the control signal CTa.

The control unit 30 also controls the signal-processing portion 222 to set its signal-processing operation or the setting condition of the master imaging apparatus based on the control signal CTb. For example, when the signal-processing portion 222 performs white balance adjustment, linear matrix interpolation, and color adjustment such as hue adjustment, the control unit 30 controls the signal-processing portion 222 to set how gain is obtained by the white balance adjustment, masking coefficient used in the calculation of the linear matrix interpolation, and how gain is obtained by the hue adjustment, based on the control signal CTb. When the signal-processing portion 222 performs nonlinear processing such as Knee saturation and γ correction, the control unit 30 controls the signal-processing portion 222 to set Knee point, Knee slope or which calibration table is used in the Knee saturation, and to set which broken line approximation or calibration table is used in the γ correction, based on the control signal CTb. Further, when the signal-processing portion 222 performs detail processing, the control unit 30 controls the signal-processing portion 222 to set a filter for producing a signal that indicates its contour component and how gain is obtained when the signal that indicates its contour component is added.

When an imaging apparatus is set as the master imaging apparatus, the control unit 30 generates the ancillary data DSa including information that indicates setting condition in the imaging portion 221 and information that indicates setting condition in the signal-processing portion 222. The ancillary data DSa has a data structure for ancillary data, which has been standardized as, for example, society of motion picture and television engineers (SMPTE)-291M (Ancillary Data Packet and Space Formatting).

FIG. 3 shows a data structure of such the ancillary data. Name, "ADF" indicates ancillary data flag (ADF) words that specify a start of an ancillary data packet. In this moment, when the image signal Vout-m is a component signal, the ADF is set as three words (000h, 3FFh, and 3FFh) as shown in FIG. 3. When the image signal Vout-m is a composite signal, the ADF is set as one word (3FCh). It is to be noted that a value of data, "h" in a column, "Data", shown in FIG. 3 indicates use of hexadecimal notion and a value of data, "x" therein indicates that any one of the values, "0" through "H" can be used. It is also to be noted that values of data, "yyyh" in a column, "Data", shown in FIG. 3 indicate that any values within a range of values from "0004h" to "3FBh" can be used in order to avoid any confusion with the values of the ADF.

Name, "DID" indicates data identification word. Name, "SDID" indicates secondary data identification word. This DID or both of these DID and SDID indicate a species of the ancillary data.

Name, "DC" indicates data count that specifies a number of user data words (UDW).

The name, "UDW" indicates information to be transmitted. In the UDW, any information such that any imaging apparatus excluding the imaging apparatus that images a subject can get the same image signal as that of the imaged imaging apparatus if a user set the above imaging apparatus using the information included in the "UDW" is included.

In the "UDW", sub-name, "Model Name" indicates model name of the imaged imaging apparatus. Sub-name, "Camera ID" indicates a serial number of the imaged imaging apparatus. Sub-name, "Frame Number" indicates time code.

Sub-names from "Frequency (1000/1001)" to "Lookup table data" indicate setting condition of the imaged imaging apparatus. The sub-name, "Frequency (1000/1001)" indicates which frame number of the image signal Vout-m is set to 30 frames/second or 30*(1000/1001) frames/second. Sub-name, "Interlace/Progressive" indicates which the image signal Vout-m is set to an interlace scanning or a progressive scanning.

Sub-names, "Frequency1" and "Frequency0" indicate that the frame number of the image signal Vout-m is set to, for example, 24 or 25 frames/second so that any motion of the subject can be displayed as smoothly as possible like this in a film movie. Sub-name, "Step Shutter" indicates that a shutter speed of the imaged imaging apparatus is set to any one of plural shutter speeds. Sub-name, "Master Gain" indicates how steps of brightness an imaged image is set to. Sub-name, "ND Filter" indicates setting in the neural density filter. Sub-name, "CC Filter" indicates setting in the color conversion filter.

Sub-name, "D5600 ON" indicates whether or not the color temperature is set to that of 5600 K. Sub-name, "Shutter ON" indicates whether or not the shutter function is selected. Sub-name, "Video Processor Control Data" indicates which signal processing a video processor performs when the video processor is used in the signal-processing portion 222. This data enables the signal-processing portion 222, when the signal-processing portion 222 performs white balance adjustment, linear matrix interpolation, and color adjustment such as hue adjustment, to set how gain is obtained by the white balance adjustment, masking coefficient used in the calculation of the linear matrix interpolation, and how gain is obtained by the hue adjustment. This data enables the signal-processing portion 222, when the signal-processing portion 222 performs nonlinear processing such as Knee saturation and γ correction, to set Knee point, Knee slope or which calibration table is used in the Knee saturation, or to set which broken line approximation or calibration table is used in the γ correction. This data also enables the signal-processing portion 222, when the signal-processing portion 222 performs detail processing, to set a filter for producing a signal that indicates its contour component and how gain is obtained when the signal that indicates its contour component is added.

The sub-name, "Look up table data" indicates data in the calibration table used in the Knee saturation or the γ correction.

It is to be noted that the data to be included in the name, "UDW" is not limited to the above items of data. If there are any other setting items of the imaged imaging apparatus in producing the image signal, any information that indicates setting condition of these items can be included in the "UDW".

Name, "CRC" indicates error detection and correction code for each of the items of data in the "UDW". Name, "CKSUM" indicates check sum for each of the items of data from the "DID" to the "CRC".

In the data-superimposing unit 23, the ancillary data DSa having the above data structure is superimposed over the image signal Va within its blanking period of time.

The following will describe operations of the imaging system 10. When the master imaging apparatus 20m starts its operation, the control unit 30 in the master imaging apparatus 20m supplies the imaging portion 221 therein with the control signal CTa to set operation of the imaging portion 221. In this moment, the control unit 30 also supplies the signal-processing portion 222 with the control signal CTb to set operation of the signal-processing portion 221. Further, the control unit 30 generates the ancillary data DSa including information that indicates setting condition in the imaging portion 221 and information that indicates setting condition in the signal-processing portion 222 to supply the data-superimposing unit 23 with the ancillary data DSa. In the data-superimposing unit 23, the ancillary data DSa received from the control unit 30 is superimposed over the image signal Va within its blanking period of time to output it as the image signal Vout-m.

The following will describe operations of the slave imaging apparatus 20s. When the slave imaging apparatus 20s starts its operation, the data-extracting unit 24 in the slave imaging apparatus 20s extracts ancillary data DSe from the received image signal Vout-m and supplies the control unit 30 with the extracted ancillary data DSe. In this moment, the data-extracting unit 24 extracts the ancillary data DSe every time or at a timing according to any manipulation of the user interface unit 31 by the user, based on the control signal CTe received from the control unit 30. Further, the control unit 30 generates the control signals CTa, CTb to supply the imaging portion 221 with the control signal CTa and the signal-processing portion 222 with the control signal CTb, respectively.

Alternatively, if the signal-recording/reproducing apparatus 50 records the image signal Vout-m produced in the master imaging apparatus 20m on a recording medium and the slave imaging apparatus 20s then reproduces as image signal Vp-m the setting condition in the master imaging apparatus 20m when the recorded image signal Vout-m is produced by the master imaging apparatus 20m, the signal-recording/reproducing apparatus 50 supplies the slave imaging apparatus 20s with the reproduced image signal Vp-m (see FIG. 1).

Similar to a case where the slave imaging apparatus 20s receives the image signal Vout-m from the master imaging apparatus 20m directly, the slave imaging apparatus 20s extract ancillary data from the image signal Vp-m and generates the control signals CTa, CTb, based on the extracted ancillary data DSe, to supply the imaging portion 221 with the control signal CTa and the signal-processing portion 222 with the control signal CTb, respectively.

Thus, the master imaging apparatus 20m superimposes the ancillary data including information that indicates its setting condition over the image data to output the superimposed signal while the slave imaging apparatus 20s extracts the ancillary data including information that indicates the setting condition of the master imaging apparatus 20m from the received image signal to perform its setting based on the extracted ancillary data. This enables the slave imaging apparatus 20s to reproduce the setting condition of the master imaging apparatus 20m easily and automatically even if the user does not set the slave imaging apparatus 20s.

Since the ancillary data including information that indicates the setting condition of the master imaging apparatus 20m is superimposed over the image signal, the slave imaging apparatus 20s can be accurately set to a desired setting condition only by supplying the slave imaging apparatus 20s with the desired setting condition of the master imaging apparatus 20m. Further, if the ancillary data is superimposed over the image signal within its blanking period of time and the user changes setting condition in the master imaging apparatus 20m during a period of time when imaging the subject, he or she can change setting condition in the slave imaging apparatus 20s in synchronism with the change of the setting condition in the master imaging apparatus 20m when the ancillary data is changed simultaneously together with the change of the setting condition in the master imaging apparatus 20m.

According to this embodiment, the ancillary data can be superimposed over the image signal for each frame of the image signal so that an image may be displayed in the slave imaging apparatus based on the image signal Vout-m received from the master imaging apparatus 20m or the image signal Vp-m received from the signal-recording/reproducing apparatus 50. In this moment, if the user manipulates the user interface unit 31 in the slave imaging apparatus 20s at timing when an optimal image of the imaged subject is get in a display screen of the slave imaging apparatus to extract the ancillary data at this timing, the slave imaging apparatus 20 can be easily and rapidly set to its setting condition when the optimal image of the imaged subject is get. Although the ancillary data has been superimposed over the image signal for each frame of the image signal in the above embodiments, this is not limited thereto in this invention. The ancillary data can be superimposed over the image signal for each predetermined frame period. The ancillary data can be also superimposed over the image signal at a start of producing the image signal or at a change of setting. This enables various kinds of information excluding information that indicate setting condition to be superimposed over the image signal.

According to the embodiments of the invention, the slave imaging apparatus 20s can be set based on the ancillary data which is superimposed on the image signal so that each of the slave imaging apparatuses 20s can be set to the same condition to each other or their setting can be changed in synchronism with each other even if a camera control unit, not shown, supplies each of the slave imaging apparatuses 20s with no control signal that is suitable for the setting of the slave imaging apparatus. This allows any signal cable for the camera control unit to supply each of the slave imaging apparatuses 20s with their control signals to be omitted, thereby enabling an imaging system to be easily and simply constructed at a low price.

It should be understood by those skilled in the art that various modifications, combinations, sub-combinations and alternations may occur depending on design requirements and other factors insofar as they are within the scope of the appended claims or the equivalents thereof.

What is claimed is:

1. An imaging apparatus comprising:
   a signal-producing unit that produces an image signal on an image of an imaged subject;
   a data-superimposing unit that superimposes ancillary data over the image signal produced in the signal-producing unit;
   a data-extracting unit that extracts outside ancillary data from an outside image signal received from an outside master imaging apparatus; and
   a control unit that enables the imaging apparatus to be set as a desired one of a master imaging apparatus and a slave imaging apparatus,
   in which when the imaging apparatus is set as the master imaging apparatus, the control unit supplies the data-superimposing unit with the ancillary data including information that indicates setting condition of the signal-producing unit so as to enable the data-superimposing unit to superimpose the ancillary data over the image signal, and
   in which when the imaging apparatus is set as the slave imaging apparatus, the control unit controls the data-extracting unit so as to extract the outside ancillary data from the outside image signal and to generate a control signal or signals therefrom and to supply the control signal(s) to the signal-producing unit so as to set the signal-producing unit with the same setting as that of the outside master imaging apparatus.

2. The imaging apparatus according to claim 1 wherein the data-superimposing unit superimposes the ancillary data over the image signal within a blanking period of time of the image signal.

3. The imaging apparatus according to claim 1, in which the signal-producing unit, the data-superimposing unit, the data-extracting unit, and the control unit are all arranged within a single camera apparatus.

4. A method for use with an imaging apparatus, said method comprising:
   a signal-producing step of producing an image signal on an image of an imaged subject by use of a signal-producing unit;
   a data-superimposing step of superimposing ancillary data over the image signal produced in the signal-producing step by use of a data-superimposing unit;
   a data-extracting step of extracting outside ancillary data from an outside image signal received from an outside master imaging apparatus by use of a data-extracting unit; and
   a control step of enabling the imaging apparatus to be set as a desired one of a master imaging apparatus and a slave imaging apparatus by use of a control unit,
   in which when the imaging apparatus is set as the master imaging apparatus, the control step supplies the data-superimposing unit with the ancillary data including information that indicates setting condition of the signal-producing unit so as to enable the data-superimposing unit to superimpose the ancillary data over the image signal, and
   in which when the imaging apparatus is set as the slave imaging apparatus, the control unit controls the data-extracting unit so as to extract the outside ancillary data from the outside image signal and to generate a control signal or signals therefrom and to supply the control signal(s) to the signal-producing unit so as to set the signal-producing unit with the same setting as that of the outside master imaging apparatus.

5. A non-transitory computer readable storage medium having a program product stored thereon for use with an imaging apparatus, said program product allowing a computer to perform an imaging method of the imaging apparatus, said method comprising:

a signal-producing step of producing an image signal on an image of an imaged subject by use of a signal-producing unit;

a data-superimposing step of superimposing ancillary data over the image signal produced in the signal-producing step by use of a data-superimposing unit;

a data-extracting step of extracting outside ancillary data from an outside image signal received from an outside master imaging apparatus by use of a data-extracting unit; and a control step of enabling the imaging apparatus to be set as a desired one of a master imaging apparatus and a slave imaging apparatus by use of a control unit, in which when the imaging apparatus is set as the master imaging apparatus, the control step supplies the data-superimposing unit with the ancillary data including information that indicates setting condition of the signal-producing unit so as to enable the data-superimposing unit to superimpose the ancillary data over the image signal, and in which when the imaging apparatus is set as the slave imaging apparatus, the control unit controls the data-extracting unit so as to extract the outside ancillary data from the outside image signal and to generate a control signal or signals therefrom and to supply the control signal(s) to the signal-producing unit so as to set the signal-producing unit with the same setting as that of the outside master imaging apparatus.

\* \* \* \* \*